June 17, 1952     J. V. CAPUTO ET AL     2,600,844
ELECTRICAL APPARATUS
Filed Oct. 16, 1947     5 Sheets-Sheet 1

INVENTORS.
James V. Caputo
Thomas J. Crawford
BY
Harness, Dickey & Pierce
ATTORNEYS.

June 17, 1952  J. V. CAPUTO ET AL  2,600,844
ELECTRICAL APPARATUS

Filed Oct. 16, 1947  5 Sheets-Sheet 4

Patented June 17, 1952

2,600,844

UNITED STATES PATENT OFFICE 2,600,844

ELECTRICAL APPARATUS

James V. Caputo, Youngstown, Ohio, and Thomas J. Crawford, Berkley, Mich.; said Crawford assignor to said Caputo Application October 16, 1947, Serial No. 780,170

10 Claims. (Cl. 171—212)

1

The present invention relates to rotating electrical apparatus and more specifically to an electric dynamo which is adapted, among other uses, for the supplying of heavy pulses of current for relatively short intervals for a spot, projection, or flash-type electric resistance welding.

The principal objects of the present invention are: to provide an improved electrical current generating apparatus of the character described; to provide an improved cooling system for such apparatus; to provide such a cooling system which will not act to unbalance the rotating parts of the apparatus; to provide such a cooling system which will not form gas pockets; to provide such a cooling system in which the rotation of the moving parts of the electric apparatus will cause the coolant to circulate; to provide a new and improved energy storage and conversion apparatus; to provide an improved energy storage dynamoelectric machine having a flywheel for energy storage; to provide such a machine which rotates about a vertical axis; to provide means for reducing the end thrust against the bearings in such a vertically arranged electric machine; to provide a flux path for such a vertically arranged machine which includes at least a portion of the flywheel whereby the attractive effect of the flux will support the flywheel; to provide an improved exciting control system for such an electric machine; to provide such an exciting system in which the output voltage is relatively independent of changes of speed of rotation of the machine; and generally to provide a new and improved electric power-generating apparatus for use in welding systems.

Other and more detailed objects of the invention will appear in the following description and in the appended claims.

In the accompanying drawings, which illustrate preferred embodiments of the invention and throughout the several views of which corresponding reference characters are used to designate corresponding parts:

Fig. 12 is an enlarged view of a collector brush; and

It will be appreciated from a complete understanding of the present invention that the improvements thereof may be embodied in apparatus of widely varying capacities and intended for widely different types of service; that in certain of their broader aspects many features of the present complete system may be utilized independently of other features and that the present improvements may be embodied in widely differing structural forms. The present disclosure, therefore, of a particular structural embodiment is to be regarded in an illustrative and not in a limiting sense.

Figure 1:
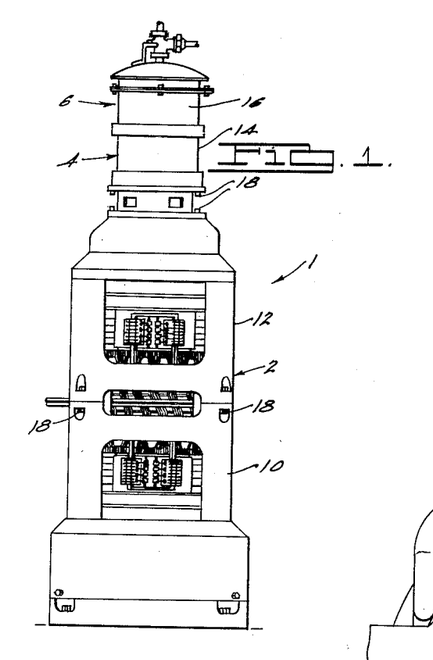
Figure 1 is a view in elevation of a motor-generator unit embodying the invention.

Referring first to Fig. 1, the motor generator combination 1 comprises a homopolar generator portion 2, a motor driving portion 4, and an exciter 6 arranged in concentric fashion one above the other in a single casing and the rotors of which are all secured together upon a common shaft 8. The single casing for the motor generator unit comprises a series of casing sections 10, 12, 14, and 16 which are suitably bolted together as by means of bolts 18.

The homopolar generator 2 comprises essentially two complementary similar halves, one of which is housed within the casing 10 and the other of which is housed within the casing 12 in generally the same manner as is disclosed and claimed in J. V. Caputo Patent No. 2,005,609, dated June 18, 1935.

Figure 2:
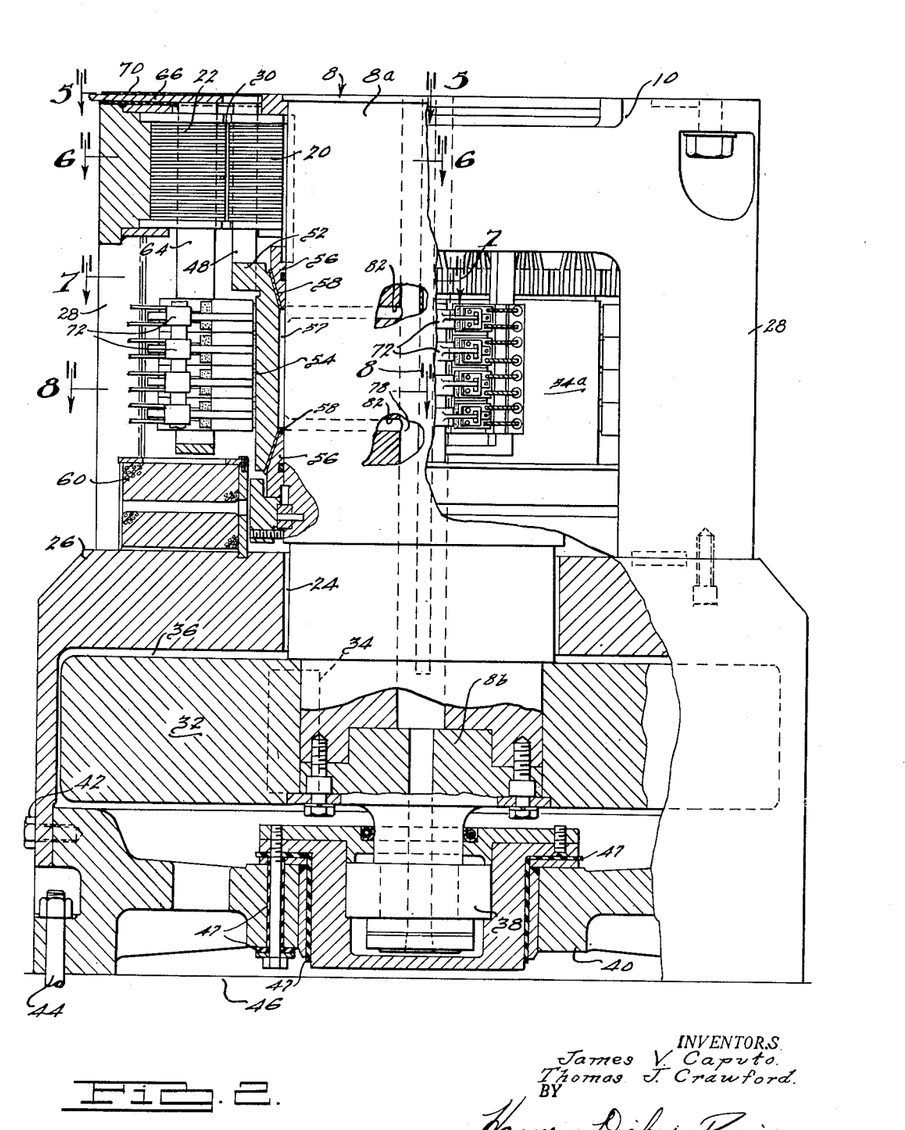
Fig. 2 is a view of the lower portion of the homopolar generator shown partly in central vertical section, the sections being taken along various radial lines to best illustrate the various constructional features thereof.

In the present construction a laminated core 20 is provided on the shaft 8 for rotation therewith and is aligned with a laminated field structure 22 held rigid with the lower casing section 10. In the said Caputo patent, flux flows longitudinally of the rotating shaft through a series of laminated core structures arranged longitudinally of the shaft; however, in the present application, flux flows directly into the shaft and longitudinally therethrough to the lower end portion, some of the flux returning to the lower casing section 10 across an air gap 24 into an annular platelike portion 26 of the section 10 and then upwardly through legs 28 of the casing section 10 back to the laminated field structure 22 and across an air gap 30 back to the laminated core 20. Other of the flux passing downwardly longitudinally through the shaft 8 flows outwardly through a flywheel 32 which is keyed by means of key 34 to the lower end of the shaft 8 through an air gap 36 to the annular platelike portion 26 and then returns to the laminated core in the manner above described in connection with the flux which passes across the air gap 24.

By properly proportioning the length of the air gaps 24 and 36, the flux made to pass across the gap 36 may be proportioned so that substantially the entire weight of the flywheel 32 may be supported due to the attractive effect of the flux passing across the gap 36. If desired, the gaps 36 and 24 may be so proportioned that not only the weight of the flywheel 32 is supported by flux passing across the gap 36 but also the weight of the other parts carried by the shaft 8 so that the end thrust during operation of the motor generator 1 may be relieved from the lower bearing 38 thereof. The lower bearing 38 for the shaft section 8b is preferably carried by a lower end bell 40 of the casing section 10 which is secured thereto as by stud screws 42. Bolts 44 may extend through other apertures in the bell 40 whereby the motor generator 1 may be secured to a suitable footing 46. The end bell 40 is preferably made of nonmagnetic material such as stainless steel or aluminum bronze and is electrically insulated from the bearing 38 by suitable insulation 47. Similarly an upper end bell 49 of nonmagnetic material carries an upper bearing 50 for the shaft section 8c, the bearing 50 being electrically insulated from the bell 49 by insulation 47.

Figure 3:
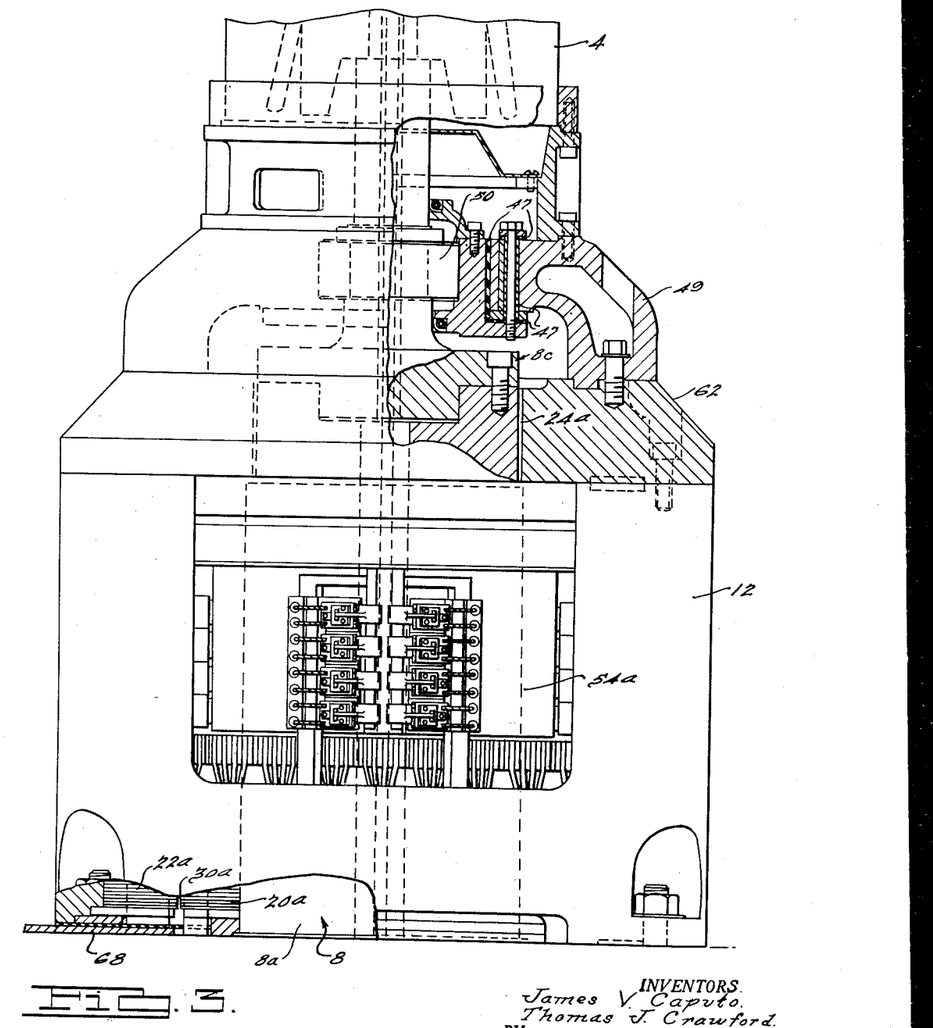
Fig. 3 is a view of the upper portion of the generator with certain parts shown in radial section to illustrate certain constructional features thereof.

The upper portion of the homopolar generator 2 located within the casing section 12 is similar to that described and comprises a laminated core 20a, a laminated field structure 22a separated by an air gap 30a so that flux from the structure 22a may flow across the gap 30a through the laminated core 20a upwardly through the shaft 8 radially outwardly across an air gap 24a and back to the laminated field structure 22a through the casing section 12. The laminated cores 20 and 20a are provided with laminated inductors 48 which are spaced circumferentially around the laminated cores 20 and 20a and extend substantially parallel to the longitudinal axis of the rotating common shaft 8. As shown in said Caputo patent, the portion of the inductors 48 located in the core 20 are preferably slightly circumferentially offset from the portion of the inductors 48 carried by the laminated core 20a to provide a diagonal connecting portion to permit limited longitudinal expansion and contraction of the inductors 48. The ends of the inductors 48 are each connected to radial flanges 52, 52a of collector rings 54, 54a respectively. The rings 54 and 54a are located concentric of the shaft 8 and held for rotation therewith between wedge-shaped collars 56. Annular insulating members 58 (shown in detail in Fig. 11) insulate the collector ring 54 from the wedge-shaped collars 56 whereby the ring 54 is electrically insulated from the shaft 8 and spaced therefrom to provide an annular chamber 57. The collector ring 54 is located longitudinally along the shaft intermediate the core 20 and the annular platelike portion 26 while the ring 54a is similarly placed above the core 20a and below an upper horizontal magnetic platelike member 62. Suitable field windings 60 are provided on the upper surface of the annular portion 26 for inducing a flow of flux across the air gaps 24, 30, and 36 in a path as above described.

The laminated field structures 22 and 22a each are provided with longitudinally extending conductor busses 64 which are parallel with the inductors 48 and are preferably equally spaced around the structures 22 and 22a. The sets of conductor busses carried by the field structures 22 and 22a, unlike the inductors 48, are not interconnected together. All of the conductor busses 64 associated with the field structure 22 are electrically connected to an annular conducting ring 66 which serves as one output terminal of the homopolar generator 2. The conductor busses 64 associated with the field structure 22a are likewise all connected together to an annular conducting ring 68 which serves as the other output terminal of the homopolar generator 2. The rings 66 and 68 are closely adjacent one another but are insulated from one another by an annular insulating ring 70. The outwardly extending end portions of all of the conductor busses 64 overlie the collector rings 54 and 54a, depending upon whether the busses are associated with the field structure 22 or 22a. To each of these overlying portions of the busses 64 is secured a brush holder 72 carrying one or more brushes 74 which are resiliently urged against the associated collector rings 54 or 54a. Each of the brushes 74 is electrically connected with the brush holder 72 by means of a pigtail 76.

Figure 7:
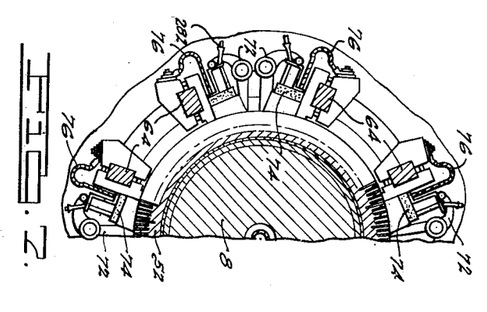
Fig. 7 is a partial view taken substantially along the line 7—7 of Fig. 2.

As is clearly shown in Fig. 7, the brushes 74 are held by the holders 72 in sets which extend at an angle relative to the radial lines of the collector rings and are arranged in pairs extending at equal acute opposite angles with respect to the radius lines. In this manner the current flowing through the brushes does not have any effect in the flux field of the generator. In some instances, however, it may be desirable to increase or decrease the flux upon increase in delivered current, and in such instances one or more groups of brushes may be arranged at equal acute angles so that either the additive or subtractive effect will be produced, since under these conditions the effect of the various sets located at one angle is not neutralized by the effect of an equal number of corresponding sets arranged at the same angle but in opposite directions from the radius line.

The common shaft 8 of the motor generator 1 comprises a section 8a which is magnetic in character having secured thereto as by bolts a lower end section 8b of nonmagnetic material and an upper end section 8c also of nonmagnetic material. The sections 8b and 8c may, for example, be aluminum bronze or stainless steel. The section 8c extends upwardly beyond the upper end bell 62 through the driving motor 4 and through the exciter 6 and terminates externally of the top of the common casing of the motor generator 1. The rotating member of the driving motor 4 is suitably secured to the shaft section 8c, so that when the driving motor 4 is energized it will rotate the common shaft 8, causing rotation of the rotating portions of the homopolar generator 2 and will also cause rotation of the rotor of the exciter 6. Preferably a three-phase alternating current motor is employed; however, any other type motor, whether alternating current or direct current, may be utilized. The exciter 6 may be any of the direct current generator types of proper rating whereby a direct current voltage across its output terminals will be produced in accordance with its speed of rotation and the degree of energization of its exciting winding as will be more thoroughly brought out hereinafter.

Figure 4:
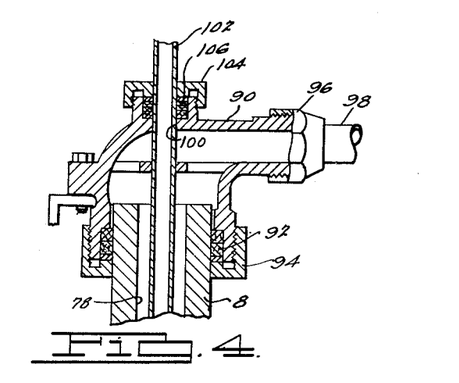
Fig. 4 is an enlarged view showing, in central vertical section, the coolant connections therefor.
Figure 5:
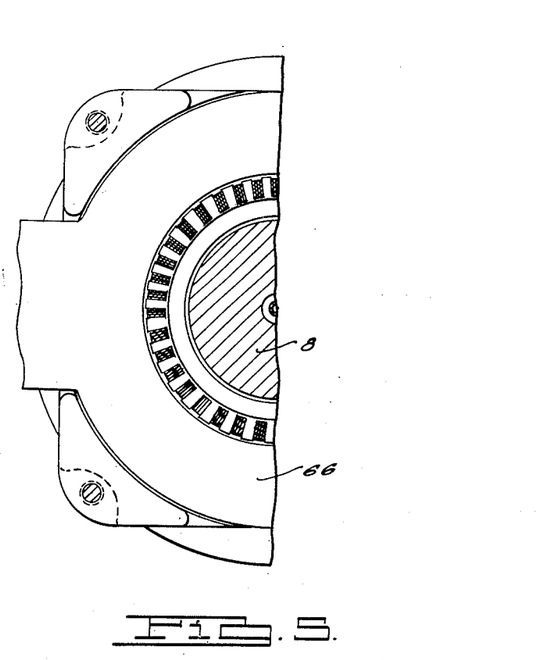
Fig. 5 is a view taken substantially along the line 5—5 of Fig. 2.
Figure 6:
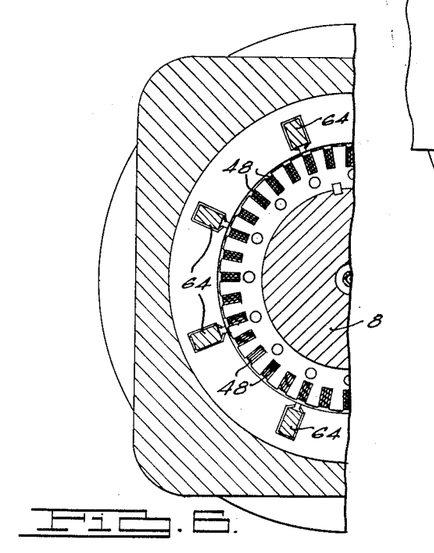
Fig. 6 is a partial view taken substantially along the line 6—6 of Fig. 2.

Referring more specifically to Figs. 2 and 4, the common shaft 8 has a longitudinal central aperture or passageway 78 extending substantially the length of the shaft and a plurality of radially extending passageways leading from the aperture 78 to annular chambers 57 formed between the outer peripheral surface of the shaft 8 and the inner peripheral surface of the collector ring 54 and bound at its top and bottom by the wedge collars 56. One set of radial passageways 82 extends from the aperture 78 radially outwardly and opens into the annular chamber 57 adjacent the lower one of the wedge collars 56. Preferably more than one of these lower radial passageways 82 are provided, and when such a plurality are used, the radial passageways are spaced around the shaft 8 in such a manner that the static balance of the shaft 8 is preserved. A second set of these radial passageways 82 extends through the wall of the shaft from the aperture 78 thereof to the top portion of the annular chamber 57 adjacent the top one of the wedge collars 56. This top set of radial passageways 82 preferably comprises more than one passageway arranged about the shaft 8 in a manner similar to the arrangement of the lower set of radial passageways 82. Similar passageways interconnect the aperture 78 of the shaft 8 with a similar annular chamber intermediate shaft 8 and the collector ring 54a located within the upper casing section 12.

An L-shaped fitting 90 is provided for the open upper end of the shaft 8 and is suitably secured to this upper end of the shaft 8 in a rotative fluid-type manner by means of packing 92 held by a cap nut 94. The L-shaped fitting 90 is anchored to the casing of the motor generator 1 by suitable means whereby it is held against rotation with the shaft 8 and in a substantially fixed longitudinal position adjacent the open upper end of the shaft. A suitable fitting 96 connects the hollow interior of the L-shaped fitting 90 to a drain conduit 98 which conducts the coolant to a suitable drain or radiating surface if the coolant is to be re-used. The L-shaped fitting 90 has an aperture 100 through one wall thereof, which aperture 100 is arranged concentrically with the passageway 78 of the shaft 8. A coolant inflow tube 102 extends through this aperture 100 and concentrically downwardly through the passageway 78 of the shaft 8 and terminates slightly upwardly from the lower portion of the lower end of the passageway 78. A suitable cap nut 104 and packing 106 seal the tube 102 within the aperture 100 to the L-shaped fitting 90 whereby coolant flow through the aperture along the outside of the tube 102 is prevented. Coolant from a suitable source of supply is conducted to the tube 102 through suitable means, not shown, but which will be well understood by those skilled in the art, down through the tube 102 into the lower end of the passageway 78 from whence it flows upwardly within the passageway 78 around the tube 102 and outwardly through the conduit 98.

As the shaft 8 rotates, the coolant within the lower set of radial passageways 82 tends to flow outwardly from the passageway 78 with a force depending on the density of the coolant and the speed of rotation of the shaft 8. Likewise, the coolant within the upper set of radial passageways 82 will also tend to flow outwardly therethrough from the passageway 78 of the shaft 8 upon rotation thereof, depending on the speed of rotation of the shaft 8 and the density of the coolant in this upper set of radial passageways 82. If the density of the coolant in both of the sets of radial passageways 82 is exactly the same, they will exert a substantially equal and opposite force upon the coolant in the annular chamber 57, and no circulation of coolant from the passageway 78 of the shaft 8 through the annular chamber 57 will result. However, since during normal operation of the homopolar generator 2 heat will be developed in the collector rings 54, the coolant within the annular chamber 57 will tend to be heated thereby. The higher the temperature of the coolant the less dense it becomes; and since with increase in temperature it tends to expand upwardly and increase the temperature of the coolant in the upper set of radial passageways 82, the pressure in the two sets of passageways 82 unbalances and a flow of coolant is provided from the passageway 78 of the shaft 8 through the lower sets of radial passageways 82, upwardly through the annular chamber 57 and back again to the passageway 78 of the shaft 8. The rate of flow of coolant will be generally proportional to the temperature of the collector rings 54. Therefore, as the output of the homopolar generator goes up and the temperature of the ring 54 tends to increase, the rate of flow of coolant through the annular chamber 57 will increase, maintaining the temperature of the collector ring within a safe limit. Conversely, as the output of the homopolar generator 2 decreases, the heating effect on the collector ring 54 will be reduced and the rate of coolant flow through the annular chamber 57 will decrease so that an excessive amount of coolant is not used to excessively reduce the temperature of the collector ring 54 below a normal temperature operating range. The collector ring 54a is similarly cooled by the beforementioned sets of passageways 82 associated therewith in a manner which it is believed will be evident from the description of the cooling of the collector ring 54.

Figures 9, 10:
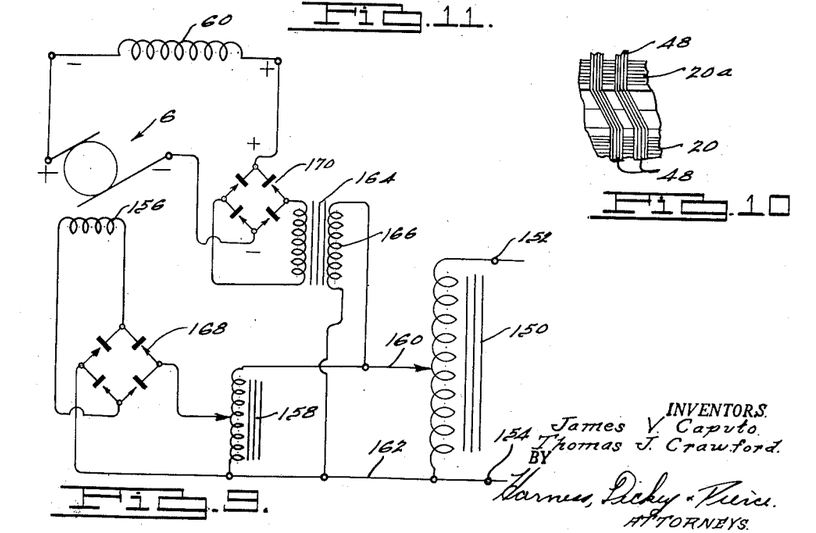
Fig. 9 is a schematic electrical diagram showing the exciting circuit for the homopolar motor generator.
Fig. 10 is a partial view showing the offset relationship of the rotor inductor bars.

Referring now more specifically to Fig. 9, 150 designates an auto transformer having input terminals 152 and 154 adapted to be connected to a suitable source of alternating current energy for use in energizing the field winding 60 of the homopolar generator 2 and the exciting winding 156 of the exciter 6. Preferably the terminals 152 and 154 are connected across one phase of the three-phase power supply for the driving motor 4. An auto transformer 158 has its input terminals connected directly across the output terminals 160 and 162 of the auto transformer 150. A transformer 164 has the terminals of its primary winding 166 connected across the output terminals 160 and 162 of the auto transformer 150. The output terminals of the auto transformer 158 are connected across the alternating current input terminals of a full-wave bridge-type rectifier 168 having its direct-current output terminals connected directly across the exciting winding 156 of the exciter 6.

The secondary winding of the transformer 164 is connected across the alternating current input terminals of a full-wave bridge-type rectifier 170 which has its direct current output terminals arranged in series circuit with the output terminals of the exciter 6 and the field windings 60 of the homopolar generator 2. The voltage of the exciter 6 is arranged to be less than the voltage of the rectifier 170. The polarity of the output terminals of the exciter 6 and the direct-current output terminals of the full-wave rectifier 174 are preferably arranged in bucking relation so that the curent flow through the field winding 60 will be proportional to the differential in voltage between that generated by the exciter 6 and that appearing across the direct-current output terminals of the full-wave bridge-type rectifier 170. It will now be evident that the voltage generated by the homopolar generator 2 will be a resultant of the rotational speed of the shaft 8 and of the differential in voltage between that generated by the exciter 6 and that appearing across the output terminals of the rectifier 170.

As the speed of rotation of the shaft 8 falls, the voltage generated by the exciter 6 will be reduced, thereby permitting a greater flow of current through the field winding 60 of the homopolar generator 2; and if the voltage characteristics of the exciter 6 with relation to speed of rotation of the shaft 8 are properly proportioned, this increase in excitation of the field winding 60 of the homopolar generator 2 due to the decreased terminal voltage of the exciter 6 will be sufficient so that the output voltage of the homopolar generator appearing between the conductor rings 66 and 68 will be substantially constant within any normal variable speed range of rotation of the shaft 8.

It is believed that the remaining details of construction may best be understood by reference to a description of operation of the motor generator 1 which is as follows:

Upon energization of the motor 4 by suitable means well known in the art and not shown herein for simplicity, the shaft 8 will be rotated at motor speed. Upon energization of the auto transformer 150 the exciting winding 156 of the exciter 6 will be energized through the auto transformer 158 and the rectifier 168 whereby a voltage will appear across the output terminals of the exciter 6. At the same time, a unidirectional voltage will appear across the output voltage terminals of the bridge rectifier 170, which voltage is preferably balanced with respect to the normal output voltage of the exciter 6 so that it is enough greater than the output voltage of the exciter 6 to cause normal exciting current to flow through the field windings 60 of the homopolar generator 2. With the field windings 60 excited, flux will flow through the paths in the generator hereinbefore described and across the air gaps 24, 30, and 36 and similar air gaps 24a and 30a of the upper portion of the homopolar generator 2. This flux passes substantially radially across the gaps 30 and 30a and through the laminated cores 20 and 20a downwardly and upwardly through the shaft section 8a. It should be noted that since the end bells 40 and 49 and shaft sections 8b and 8c are of nonmagnetic material and will not conduct flux, the flux path will not extend through the bearings 38 and 50. Since the bearings 38 and 50 are completely insulated from the end bells 40 and 49 no current will pass therethrough due to any possible unbalance in voltage induced due to the cutting of the flux by the shaft section 8a.

Figures 13, 14:
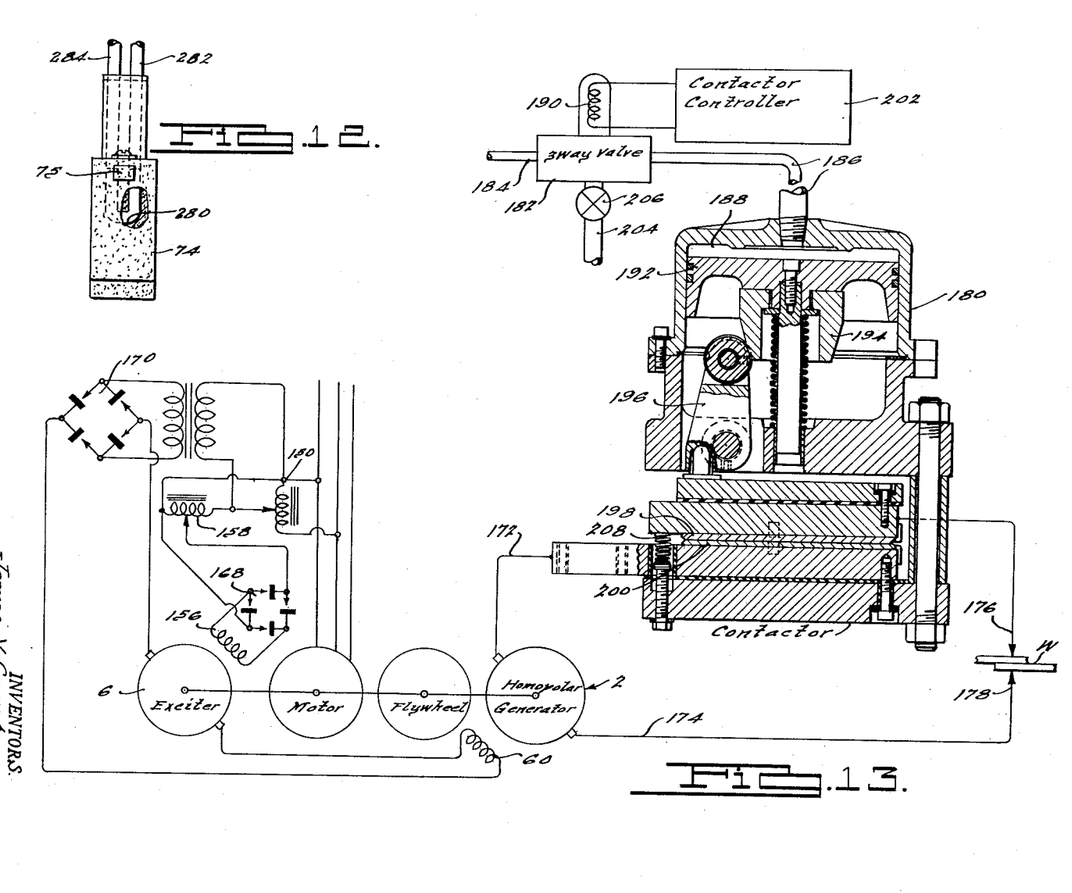
Fig. 13 is a schematic view of a welding system embodying the invention.

As the shaft section 8a and the cores 20 and 20a rotate, this flux will be cut by the inductors 48, causing a voltage to be induced therein. Since the direction of cutting of the flux by the inductors 48 associated with the core 20 and the inductors 48 associated with the core 20a is in the same direction, the voltages induced by the cutting of the flux passing across the gaps 30 and 30a will be additive. The upper collecting ring 54a will be of one polarity and the lower collector ring 54 will be of the opposite polarity. The collector rings are electrically connected by means of the associated brushes 74 to the respective sets of conductor busses 64 and therethrough to the conducting rings 66 and 68 which form the output terminals of the homopolar generator 2. The rings 66 and 68 may be connected by suitable conductors 172, 174 connected to welding electrodes diagrammatically shown at 176 and 178 between which the work W is clamped. A contactor 180 of a type available on the open market is connected in series with the conductor 172. A three-way valve 182 has its inlet conected to a suitable source of fluid pressure through conduit 184 and its outlet connected by a conduit 186 to the pressure chamber 188 of the valve 180. Energization of the control winding 190 of the valve 180 acts to connect the source of fluid pressure to the chamber 188 whereby the associated piston 192 will move downwardly, causing the cam 194 thereof to rotate the bell cranks 196 (one only being shown) whereby the carbon disks 198 and 200 are held in intimate contact for closing the circuit through the conductor 172.

Operation of the valve 182 is preferably controlled by any of the usual contactor controllers 202 which may be purchased on the open market. Such controllers, upon being actuated, will energize the circuit for the winding 190 for a predetermined time interval usually for a limited number of cycles of a sixty-cycle current source after which the winding 190 will be de-energized. Upon de-energization of the winding 190 the valve 182 will close the connection between conduits 184 and 186 and place conduit 186 in open communication with the exhaust conduit 204 whereby fluid pressure is relieved from the chamber 188 at a controlled rate as determined by a control valve 206 located in the conduit 204. As the fluid pressure escapes from the chamber 188 the piston will move upwardly allowing the bell cranks 196 to rotate clockwise and reduce the pressure at which the disk 198 engages the disk 200, thereby increasing the resistance to current flow therebetween and reducing the current flow through the conductor 172 to a value which preferably does not exceed 5% of the normal current flow during welding and in many instances to a value considerably below 5%. Continued reduction in pressure permits further clockwise rotation of the cranks 196, and the springs 208, one only of which is shown, will separate the disks 198 and 200 to interrupt the welding circuit through the conductor 172. By so arranging the contactor, current in the order of upwards of 100,000 amperes may be interrupted rapidly without destructive arcing between the disks 198 and 200, since the inductively stored energy of the system will be substantially dissipated before interruption at the disks 198 and 200.

When the contactor 180 controlling the energization of the welding electrodes 176, 178 is closed, whereby welding current is supplied thereto, the power required to effect the welds is somewhat greater than the power which may be transferred by the driving motor 4 to the shaft 8 so that the shaft 8 tends to reduce somewhat in speed. Due to the presence, however, of the flywheel 32 and the kinetic energy thereof, the shaft 8 will tend to rotate at a substantially constant speed until such time as energy is absorbed from the flywheel 32 when it slows down somewhat. However, due to the bucking arrangement of the exciting generator, such slow down of the shaft 8 will decrease the bucking voltage applied by the exciter 6 and thereby raise the energization of the exciting windings 60 of the homopolar generator 2 so that the voltage output generated by the homopolar generator 2 is maintained substantially constant whereby the potential supplied to the welding electrodes may be held substantially constant and a commercially satisfactory weld be effected between the workpieces W being joined.

Figures 8, 11:
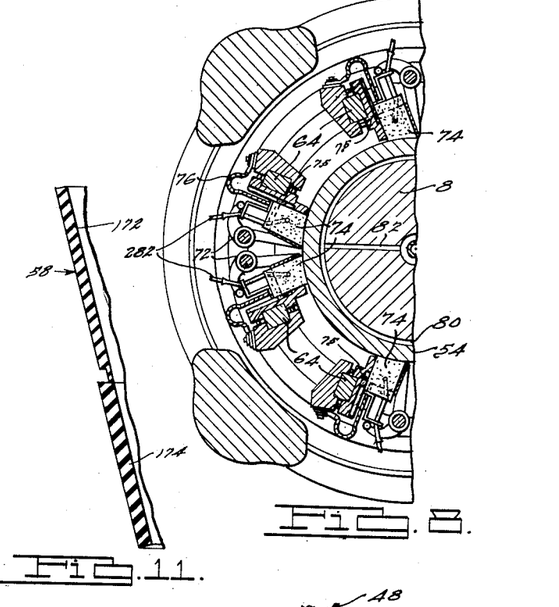
Fig. 8 is a partial view taken substantially along the line 8—8 of Fig. 2.
Fig. 11 is a partial sectional view showing the sealing member for the collector ring.

As the generator 2 is so used, heat due to the passage of current through the collector rings 54 and 54a will be generated therein, causing coolant to circulate through the annular chambers 57, which flow of coolant through chambers 57 as hereinbefore described will be somewhat proportional to the current output of the generator 2 whereby the rings 54 and 54a will be maintained with the normal temperature operating limit. As shown in Fig. 11, the insulating and sealing members 58 comprise a hollow truncated cone portion 172 of mica and a hollow truncated cone portion 174 of silicone rubber. The rubber being more compressible than the mica is initially thicker but, as indicated in Fig. 2, is compressed to the same thickness when assembled to insure a fluid-tight seal. The rubber 174 in Fig. 11 is shown in its expanded condition. When it is compressed, it will expand lengthwise to some extent, and a recess 176 is provided in the portion 172 for receiving at least some of this displaced rubber, so that when installed with the rubber 174 compressed, the recess 176 will be filled. The portions 172 act to positively locate and hold the collector rings 54 with respect to the shaft 8, while the rubber 174 seals the joint. If rubber alone were used, the rings 54 might, under certain conditions of operation, have a vibratory movement with respect to the shaft 8 which might cause unbalance of the rotating parts and jumping of the brushes. When a member 58 of such material is used, the inductor 48 may be soldered in place after assembly of the ring 54 to the shaft section 8a.

The brushes 74 preferably are formed from copper dust with which has been intimately mixed a suitable amount of carbon or graphite dust. A coolant passageway 280 is provided in the upper end portion of the brush 74 which may be a passageway molded directly in the brush material, one of which is formed directly in the material after the brush is fabricated or one of which is formed by a tube molded in the brush at the time of its fabrication. Lugs 75 are provided on the brushes which fit in slots in the brush holder to limit inward movement thereof so that the brush cannot wear away sufficiently to expose the passageway 280.

Preferably one or more of the brushes are formed by the first-named method in which short lengths of tubing 282 and 284 are provided for connecting the coolant supply and return to the passageway 280. With this type passageway 280, a certain amount of the coolant passes through the brush, similar to oil through a self-oiling bearing, outwardly through the surface of the brush in contact with the ring 54 to aid in providing an oxide film on the ring 54. The use of this type of brush obviates the need for supplying humidity around the contacting brush surfaces to produce the desired oxide film as has often been done by those skilled in the art by humidifying the atmosphere surrounding brush type dynamoelectric machines. It has been found that this type of cooled brush with the moist surface permits the use of current densities substantially higher than has heretofore been thought practicable and still maintain a satisfactory brush life.

A brush containing substantially 90% of 300 mesh copper and 10% of 300 mesh graphite compacted and sintered to a density of from 90 to 95% of the density of the basic materials and used with water as a coolant at pressure from 1 to 10 pounds per square inch will provide enough water at the brush surface to insure a desirable oxide film on the rotating metallic surface. Also such a brush has been used with current densities of one thousand amperes and above for protracted periods of time without showing any appreciable wear and it is believed that these densities may be increased severalfold.

What is claimed and is desired to be secured by United States Letters Patent is as follows:

1. In a homopolar generator, a rotor arranged to rotate about a vertical axis, a hollow vertically extending shaft carrying said rotor and providing a chamber for the upflow of coolant, means providing a container for coolant outwardly of said shaft from the hollow interior thereof, vertically spaced passageways in said shaft communicatively connecting said container with the hollow interior of said shaft, and fluid conveying means for supplying coolant to one end portion of the hollow interior of said shaft, the other end portion of said shaft being open for the discharge of coolant therefrom.

2. In a dynamoelectric apparatus, a support, a rotating member carried for rotation on a vertically extending shaft journaled for rotation in said support, said shaft having a longitudinally extending central passageway, means providing a coolant containing pocket in heat-exchange relation with said member, means providing an inlet passageway to said pocket from said central passageway, means providing an outlet passageway from said pocket to said central passageway, said outlet passageway being elevated above said inlet passageway, and fluid conveying means opening into said central passageway below said outlet passageway.

3. In a dynamoelectric apparatus, a support, a rotating member carried for rotation on a vertically extending shaft journaled for rotation in said support, said shaft having a longitudinally extending central passageway, means providing a coolant containing pocket in heat-exchange relation with said member, said shaft having a radially extending inlet passageway to said pocket from said central passageway and having a radially extending outlet passageway from said pocket to said central passageway, said outlet passageway being elevated above said inlet passageway, and fluid conveying means opening into said central passageway below said outlet passageway.

4. In a dynamoelectric apparatus, a vertically extending shaft journaled for rotation about its longitudinal axis, a slip ring carried by said shaft and spaced therefrom to form an annular coolant container, said shaft having a central longitudinally extending passageway centrally of said container and vertically spaced radially extending fluid-flow passageways, said spaced passageways being located adjacent upper and lower portions of said slip ring and connecting said central passageway with said container whereby coolant will flow outwardly from said central passageway through the lower one of said radial passageways and into said annular container and inwardly to said central passageway from said container through the upper one of said radial passageways.

5. In a dynamoelectric apparatus, a vertically extending shaft journaled for rotation about its longitudinal axis, a slip ring carried by said shaft and spaced therefrom to form an annular coolant container, said shaft having a central longitudinally extending passageway centrally of said container and vertically spaced radially extending fluid-flow passageways connecting said central passageway with said container whereby coolant will flow outwardly from said central passageway through the lower one of said radial passageways and into said annular container and inwardly to said central passageway from said container through the upper one of said radial passageways, and a coolant-conveying conduit extending centrally of said central passageway for supplying coolant thereto below said upper radial passageway.

6. In a dynamoelectric apparatus, a vertically extending shaft journaled for rotation about its longitudinal axis, a slip ring carried by said shaft, and spaced therefrom to form an annular coolant container, said shaft having a central passageway extending longitudinally and centrally of said container and opening through the top wall of said shaft, said shaft having vertically spaced radially extending fluid-flow passageways connecting said central passageway with said container whereby coolant will flow outwardly from said central passageway through the lower one of said radial passageways and into said annular container and inwardly to said central passageway from said container through the upper one of said radial passageways, and a coolant-conveying conduit extending centrally of said central passageway and above said shaft top wall for supplying coolant thereto below said upper radial passageway.

7. In an apparatus of the character described, a hollow shaft, bearing means for supporting said shaft for rotation of said shaft about its longitudinal axis, voltage inducing means carried by and rotatable with said shaft, a sleeve member carried by and rotatable with said shaft, conductor means connecting said inducing means with said sleeve member, collector brushes having sliding engagement with said sleeve member, fluid flow conveying means for supplying a coolant to the hollow interior of said shaft at one portion thereof, means for exhausting coolant from said interior at a point spaced on the opposite side of said sleeve member from said one portion, said hollow interior being arranged for coolant flow therethrough to cool said shaft, and means including fluid flow passageways through which coolant from said interior may flow to and return from said sleeve member for cooling the engaging surfaces of said sleeve member with said brushes.

8. The combination of claim 7 in which said last-named means comprises coolant chambers located intermediate said shaft and said sleeve member and coolant chambers within said brushes whereby the heat of said surface is extracted in both directions from said surfaces.

9. The combination of claim 8 in which said bearing means supports said shaft with its longitudinal axis extending substantially vertically and in which said passageways are vertically spaced along said shaft for interconnecting the one of said coolant chambers located intermediate said shaft and said sleeve member with the hollow interior of said shaft.

10. In a homopolar generator, a rotor arranged to rotate about a vertical axis, a hollow vertically extending shaft carrying said rotor in heat exchange relation, the hollow interior of said hollow shaft forming a chamber for the upward flow of coolant, a collector cylinder carried concentrically with and by said shaft at each side of said rotor intermediate portions of said collector cylinders being spaced from said shaft to provide coolant containers, each said container being connected to said hollow interior by a pair of vertically spaced passageways, fluid flow conveying means for supplying coolant to a lower portion of said interior, said lower portion being at least as low as the lowermost one of said passageways, and means to permit flow of coolant outwardly of said interior at a portion thereof above the uppermost one of said passageways.

JAMES V. CAPUTO.
THOMAS J. CRAWFORD.

REFERENCES CITED

The following references are of record in the file of this patent:

UNITED STATES PATENTS

| Number | Name | Date |
| --- | --- | --- |
| 265,782 | Edison | Oct. 10, 1882 |
| 332,427 | Parham | Dec. 15, 1885 |
| 367,470 | Thomson | Aug. 2, 1887 |
| 1,055,963 | Zimmerman | Mar. 11, 1913 |
| 1,315,766 | Feldman | Sept. 9, 1919 |
| 1,778,640 | Maher | Oct. 14, 1930 |
| 1,784,102 | Lincoln | Dec. 9, 1930 |
| 2,103,931 | Berger | Dec. 28, 1937 |
| 2,293,508 | Killam | Aug. 18, 1942 |
| 2,389,214 | Shobert | Nov. 20, 1945 |

FOREIGN PATENTS

| Number | Country | Date |
| --- | --- | --- |
| 421,840 | Great Britain | Jan. 1, 1935 |
| 453,449 | France | Apr. 3, 1913 |